Patented Oct. 28, 1952

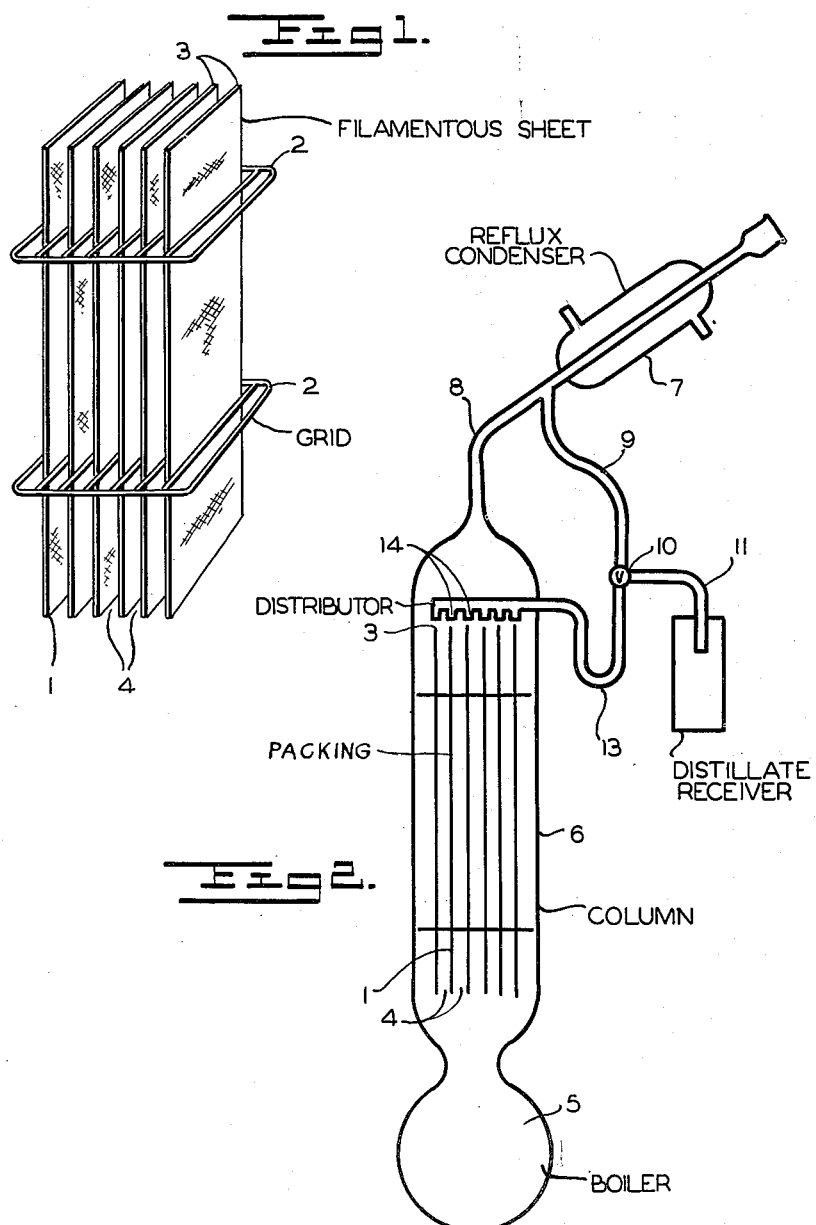

2,615,835

UNITED STATES PATENT OFFICE 2,615,835

PACKING FOR A DISTILLATION COLUMN

Olaf George Dixon, Norton-on-Tees, England, assignor to Imperial Chemical Industries Limited, a corporation of Great Britain Application November 7, 1946, Serial No. 708,223
In Great Britain November 13, 1945

4 Claims. (Cl. 202—153)

This invention relates to the treatment of gases or vapours with liquids.

In processes for the treatment of gases or vapours with liquids, for example, in distillation and gas-washing processes, it has been customary to provide large surfaces on which intimate contact between the fluid and liquid can take place. For example there have been used columns packed with a multiplicity of filling bodies made from a wide variety of materials and having a wide variety of shapes, for example, filling bodies have been made from ceramic materials, metals, and wire gauze in the form of cylinders, rings and saddles. In general, in columns which are random packed with such filling bodies their efficiency decreases as the column dimensions increase, and in particular as the greatest cross-sectional dimensions of the column for example, its diameter increases. This decrease in efficiency is due for example, to the difficulty of maintaining uniform distribution of the liquid being used, such uneven distribution resulting in the production of paths for the gas or vapour along which no liquid is flowing, that is the so-called channelling, or resulting in the so-called "roping" of the liquid, that is the formation of a continuous stream of liquid down the column within which stream no contact takes place between the liquid and the gas or vapour being treated.

The manufacture of the filling bodies hitherto used is tedious and expensive, and, in use, columns packed with them tend to have a high pressure drop and to become choked with solids if such are present in the fluids and liquids being treated.

The present invention provides apparatus for the treatment of fluids with liquids, by means of which the hereinbefore mentioned disadvantages are avoided, and whereby improved efficiency is obtained, as compared with apparatus hitherto used. The apparatus is particularly suitable for use where a high pressure drop across the column cannot be tolerated, where it is desirable or necessary to operate with a high gas or vapour velocity through the column, or where the liquid rate is low.

According to the present invention there is provided a novel form of packing which is suitable for use in the treatment of gases or vapours with liquids which comprises a plurality of sheets of filamentous material the apertures in each of the said sheets being adapted to be sealed with liquid under the operating conditions, the said sheets being arranged to provide between them one or more passages for the flow of gas or vapour.

Preferably the sheets of filamentous material are maintained out of contact with the walls of the vessel containing them.

As a further feature of the present invention there is provided apparatus suitable for the treatment of gases or vapours with liquids which comprises a containing vessel in which there is arranged a plurality of sheets of filamentous material the apertures in each of which can be sealed with liquid under the operating conditions, the said sheets being arranged to provide between them one or more passages for the flow of gas or vapour, and means for irrigating the sheets of filamentous material with liquid.

The sheets of filamentous material may be produced from woven materials, made up from wire, glass wool, slag wool or filaments of synthetic resins, but it should be understood that sheets made from filaments assembled by methods other than weaving are suitable for use according to the present invention so long as the apertures in the sheet material can be sealed with liquid under the operating conditions. For example, a suitable sheet may be obtained by assembling a series of wires in the form of a grid and spot welding the intersections of the wires. It is convenient however, to use wire gauze which may be made from any suitable metal such as copper, brass, Phosphor bronze or stainless steel.

The packing of the present invention may be arranged in a suitable containing vessel, which, in a direction at right angles to its longitudinal axis may be of any suitable cross-section, but it is preferable for it to have a rectangular cross section, as this simplifies the fitting of the sheets of filamentous material into the containing vessel.

It should be understood that the novel packing may be used in containing vessels of any desired dimensions. As compared with containing vessels packed with the filling bodies hitherto used, particularly beneficial results are obtained when the packing of the present invention is used in columns of large dimensions, such as those used for washing large quantities of gases or for large-scale distillation processes.

The sheets of filamentous material may be substantially flat, or if desired, they can be provided with indentations and they can have corrugations in a direction either parallel with or transverse to the direction of flow of the gases or vapours. When the filament sheets have corrugations transverse to the direction of the flow of gases or vapours the latter are given a tortuous path, whereby more intimate and longer time of contact between the liquid and the gas or vapour is attained. The corrugated sheets may be in any suitable relationship with one another, for example, the troughs in one sheet may be opposite the ridges in adjacent sheets or opposite the troughs in adjacent sheets.

If desired plane or corrugated sheets of filamentous material may be twisted about their longitudinal axes so that their surfaces make a part of a turn or one or more complete turns about the longitudinal axis of the containing vessel.

In the process of the present invention it is important to ensure an even distribution of liquid to the filamentous sheets. This distribution may be obtained in any convenient manner, for example, when using the packing of the present invention for distillation purposes, and reflux liquid is being used to irrigate the sheets of filamentous material, the reflux liquid may be divided into streams proportional to the widths of the individual sheets, the streams then being fed to the upper portions of the corresponding sheets of filamentous material, or to their upper edges.

The sheets of filamentous material need not be arranged in substantially vertical planes but may have their longitudinal axes inclined to the vertical, in which event it is however desirable to employ plane sheets with their transverse edges horizontal to avoid draining of liquid to one side of the sheet and dripping of liquid from one sheet to another. The inclination to the vertical should not be so great that liquid can drip from one sheet to another.

We have also found, when using the packing of the present invention for the treatment of gases or vapours, that it is particularly advantageous, immediately prior to use, to flood the packing with the liquid to be used. More particularly, we have found it advantageous to flood the packing with liquid using one of the three hereinafter described methods, whereby the apertures in the sheets of filamentous material are sealed, and thereafter to maintain the said apertures completely and continuously sealed by providing a sufficient flow of liquid down the sheets of filamentous material.

*Method A.*—The flooding of the column for the purpose of sealing the apertures in the woven material of the novel packing, should be attained by introducing liquid into the column and arranging a temporary hold-up of liquid at the bottom of the column, for example by means of an adjustable orifice until the column is completely flooded with liquid. The column should then be deflooded by gradually removing the temporary hold-up, for example gradually opening the adjustable orifice if such is used, at the same time providing for a rate of flow of liquid down the column at least sufficient to maintain the apertures in the packing sealed with liquid under the conditions of operation. For example, in the case of distillation apparatus using an adjustable orifice, the liquid for the flooding of the column and for maintaining a sufficient flow of liquid down the column may be reflux liquid.

*Method B.*—In the case of a packed column fitted at the top with a reflux condenser and attached to a boiler for distillation purposes, the boiler, and if necessary, depending on the liquid to be distilled, part of the column should be filled with the liquid, and the boiler and/or the column subsequently heated, whereby the liquid ascends the column by expansion and boiling, thus completely flooding the column and the packing therein. Then, while gradually removing liquid from the boiler, liquid which may conveniently be reflux liquid, is fed to the column at a rate at least sufficient to maintain the apertures of the packing completely sealed. When this rate is adjusted, and a suitable level of liquid attained in the boiler, withdrawal of distillate from the system may be commenced, ensuring however, that liquid continues to flow down the column in quantity sufficient to maintain the apertures in the woven material of the filling bodies sealed with liquid.

*Method C.*—In distillation apparatus, the column may be completely isolated from the boiler and filled with the cold liquid to be distilled whereby the packing of the column is completely flooded. The liquid is then allowed to flow slowly into the boiler and heating commenced, while at the same time at least sufficient liquid, to maintain the apertures in the woven material of the filling bodies completely sealed, is withdrawn from the bottom of the column and/or from the boiler and returned to the top of the column, until the quantity of reflux liquid passing down the column is at least sufficient to maintain the sealing of the apertures, whereupon the circulation of liquid can be stopped.

With a given packing and a given rate of flow of gas or vapour through the passage or passages between the sheets of filamentous material, the minimum rate of liquid sufficient to maintain complete and continuous sealing of the apertures in the said sheets may be determined by a few simple preliminary tests, the efficiency of the apparatus showing a marked decrease when unsealing occurs.

As compared with a similar assembly of solid sheets, an assembly of sheets of filamentous material according to the present invention can be kept wetted over substantially its whole area with very low rates of liquid flow. Such an assembly of sheets of filamentous material is therefore particularly advantageous in distillation columns where the ratios of liquid to vapour are much smaller than in the usual gas-absorption or gas-washing processes. In gas-absorption or gas-washing processes where it is however desirable or even essential to use low liquid rates, the packing of the present invention is advantageous as the whole of the surfaces of the packing can be maintained substantially completely wetted with a very much smaller rate of liquid than when packings having solid surfaces are used.

Referring to the accompanying drawing, Figure 1 is a perspective view of a series of sheets of wire gauze assembled into a unit for insertion in a column of square cross-section. Numeral 1 indicates one of the series of sheets which are attached to grids 2 and are thereby spaced apart from each other and from walls of the containing vessel. In operation within a column, liquid may be fed to the upper edges 3 of the sheets while gas or vapour may pass upwards between the sheets in the passages 4.

Figure 2 illustrates diagrammatically distillation apparatus containing packing according to the present invention. A boiler 5 is connected to a column 6 which is connected to a reflux condenser 7 by pipeline 8. Attached to the reflux condenser is a pipeline 9 through which reflux liquid flows from the condenser 7 and can be divided as desired into two streams by valve 10, one stream passing through pipeline 11 to the distillate receiver 12 and the other through pipeline 13 to liquor distributor 14. Sheets of wire gauze are spaced within the column 6, with their upper edges 3 beneath orifices in the liquor distributor 14. In operation vapours ascend from the boiler 5 up the column 6 through the passages 4 formed by the filamentous sheets and pass to the reflux condenser 7. Reflux liquor passes through pipeline 9 and a part is withdrawn as desired through pipeline 11, while the remainder passes through pipeline 13 and distributor 14 to the upper edges 3 of the sheets of wire gauze 1, and flows down them towards the boiler. By this means intimate contact between reflux liquid and ascending vapours is ensured.

*Example 1*

A mild steel distillation column 2 feet long and having a cross-section in a direction at right angles to its axis of 1½ inches by 1½ inches was fitted with 6 sheets of Phosphor bronze wire gauze, the sheets being spaced approximately ¼ of an inch apart. The wire gauze had 60 meshes to the inch. The column was fitted with a boiler of 15 litres capacity and a reflux condenser. 5 litres of a mixture containing 20 moles per cent of carbon tetrachloride and 80 moles per cent benzene were placed in the boiler, and, without making any provisions for the preliminary flooding of the packing, the boiler was heated to give a distillation rate of 4000 gms. per hour, the apparatus being operated on 100% reflux. When steady conditions prevailed, the refractive indices of the boiler liquid and of the reflux liquid were measured, and the mole fractions of benzene and carbon tetrachloride in the boiler liquid and in the reflux liquid were determined from the International Critical Tables 7, 1930, page 77. From these values, the volatility ratio of the components was determined from the equilibrium data given by Rosanoff and Easley, Journal of the American Chemical Society, 1909, pages 953-987, and by substituting this value in the formula given by Fenske in Industrial and Engineering Chemistry 24 (1932), pages 482-5, the number of theoretical plates in the column was found to be 2.60.

*Example 2*

The same apparatus was assembled, but an adjustable orifice was installed at the bottom of the column, to provide a temporary hold-up of liquid in the column. Using the same test liquid and operating conditions as described in Example 1, the adjustable orifice was partially closed so that liquid built up in the column and flooded the packing. Then without altering the rate of distillation (i. e. 4000 gms. per hour) the adjustable orifice was gradually opened, whereby the liquid flowed from the column into the boiler. When steady conditions, at 100% reflux were attained, the number of theoretical plates in the column was determined as above described and was found to be 3.75, i. e. an increase in efficiency of about 44%.

In the appended claims the term "gaseous" is used to designate both substances which are gaseous under normal conditions of temperature and pressure and normally liquid substances in vapourized form. Clearly related subject matter is contained in applications Serial Nos. 702,048, 730,677, and 730,678.

I claim:

1. Apparatus for treating gases and liquids which comprises a vaporizer, a vertical column, a condenser and conduits connecting said parts in the order named; said column having a packing consisting substantially wholly of vertically disposed and spaced apart filamentous sheets having their upper edges exposed within the upper portion of the column enclosure; a condensate conduit leading from the condenser and having one branch for discharging condensate from the system and a second branch for returning condensate to the column; means connected with said second branch for irrigating said upper exposed portions of the filamentous sheets with condensate for maintaining the sealing of the filamentous openings with liquid; and means between said branches for controlling the discharge and return of the condensate.

2. Apparatus for treating gases and liquids which comprises a vaporizer, a vertical column, a condenser and conduits connecting said parts in the order named; a return conduit for returning condensate to the upper portion of the column; a packing mounted in the column, said packing consisting substantially wholly of vertically disposed sheets of filamentous material having their upper edge portions exposed in the upper enclosure of the column; the side edges of said sheets being spaced from the inner sidewall of the column for permitting the flow of gas therearound; a perforate means contacting the inner side walls of the column and secured to the sheets for spacing the sheets from each other and from the inner wall of the column; and means connected to the return conduit for irrigating the vertical sheets and for maintaining the sealing of the openings therein with liquid.

3. Apparatus for the distillation of liquids which comprises a column with a packing mounted therein, said packing consisting substantially wholly of vertically disposed sheets of filamentous material, the apertures in each of said sheets being sealable with liquid under operating conditions, said sheets being spaced apart to provide between them one or more paths for the flow of vapor, said paths being substantially parallel to the surfaces of the said sheets, and means for irrigating the upper portions of the sheets with reflux liquid.

4. Apparatus for the distillation of liquids which comprises a column with a packing mounted therein, said packing consisting substantially wholly of parallel vertically disposed sheets of filamentous material, the apertures in each of said sheets being sealable with liquid under operating conditions, said sheets being spaced apart to provide between them one or more paths for the flow of vapor, said paths being substantially parallel to the surfaces of the said sheets, and means for irrigating the upper portions of the sheets with reflux liquid.

OLAF GEORGE DIXON.

REFERENCES CITED

The following references are of record in the file of this patent:

UNITED STATES PATENTS

| Number | Name | Date |
|---|---|---|
| 462,689 | Castle | Nov. 10, 1891 |
| 1,804,554 | Dubbs | May 12, 1931 |
| 2,198,305 | Crawford | Apr. 23, 1940 |
| 2,251,185 | Carter et al. | July 29, 1941 |
| 2,376,341 | Burk et al. | May 22, 1945 |

FOREIGN PATENTS

| Number | Country | Date |
|---|---|---|
| 3,791 | Great Britain | of 1877 |
| 378,621 | Germany | June 25, 1921 |

OTHER REFERENCES

Industrial and Engineering Chemistry, Analytical Edition, vol. 15, pages 290-293, April 15, 1943.

Howard, Ind. and Eng. Chem., Anal. Ed., vol. 19 (1947), page 144.

"Laboratory Technique in Organic Chemistry," by A. A. Morton, (c), 1938, by McGraw-Hill Book Company, Inc., pages 83 and 84.